3,014,900
Patented Dec. 26, 1961

3,014,900
PROCESS FOR THE PREPARATION OF
KETOSIDOPURINES
William Schroeder, Pavilion Township, Kalamazoo County, Mich., assignor to The Upjohn Company, Kalamazoo, Mich., a corporation of Delaware
No Drawing. Filed Jan. 26, 1959, Ser. No. 788,761
22 Claims. (Cl. 260—211.5)

This invention relates to a process for the preparation of purine ketosides and to novel compounds obtained thereby.

The preparation of nucleosides, for example, adenosine, inosine, guanosine, and the like, in which the sugar residue is that of an aldose, is well-known in the art. Such nucleosides are intermediates in the preparation of the corresponding nucleotides, for example, adenylic acid (adenosine-monophosphate), adenosine triphosphate, and the like, which are essential cell metabolites. The corresponding nucleosides and nucleotides in which the sugar residue is a ketose have not been described previously and it has not been recognized that such compounds have valuable properties as will be described more particularly hereinafter.

Accordingly, it is an object of the present invention to provide a process for the synthesis of novel nucleosides which are derived from a ketose sugar and a purine. It is a further object of the invention to provide novel nucleosides derived from a ketose sugar and a purine. Other objects of the invention will be apparent to one skilled in the art.

The process of the invention provides a method of synthesizing nucleosides which can be represented by the following general formula:

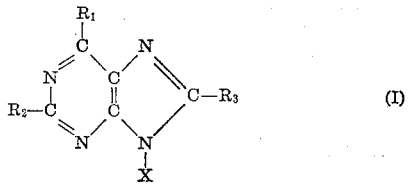

(I)

wherein the groups $R_1$, $R_2$, and $R_3$ are selected from the class consisting of hydrogen, halogen, lower-alkyl, lower-aralkyl, lower-aryl, mercapto, lower-alkylmercapto, lower-aralkylmercapto, lower-arylmercapto, hydroxy, lower-alkoxy, lower-aralkoxy, lower-aryloxy, and

wherein $R_4$ and $R_5$ represent radicals selected from the class consisting of hydrogen, lower-alkyl, lower-aralkyl and lower-aryl, and X represents the residue of a ketose sugar containing from 5 to 7 carbon atoms, inclusive.

The term "lower-alkyl" as used throughout the specification and claims, is intended to mean an alkyl radical containing from one to eight carbon atoms, inclusive, such as methyl, ethyl, propyl, butyl, amyl, hexyl, heptyl, octyl, and isomeric forms thereof; the term "lower-aralkyl" is intended to mean an aralkyl radical containing from seven to thirteen carbon atoms, inclusive, such as benzyl, phenylethyl, α-naphthylmethyl, benzhydryl, and the like; the term "lower-aryl" is intended to mean an aryl radical containing from six to twelve carbon atoms, inclusive, such as phenyl, tolyl, xylyl, naphthyl, biphenylyl, and the like; the term "lower-alkylmercapto" is intended to mean an alkylmercapto radical containing from one to eight carbon atoms, inclusive, such as methylmercapto, ethylmercapto, propylmercapto, butylmercapto, amylmercapto, hexylmercapto, heptylmercapto, octylmercapto, and isomeric forms thereof; the term "lower-aralkylmercapto" is intended to mean a lower-aralkylmercapto radical containing from seven to thirteen carbon atoms, inclusive, such as benzylmercapto, phenylethylmercapto, α-naphthylmethylmercapto, benzhydrylmercapto, and the like; the term "lower-arylmercapto" is intended to mean an arylmercapto radical containing from six to twelve carbon atoms, inclusive, such as phenylmercapto, tolylmercapto, xylylmercapto, naphthylmercapto, biphenylylmercapto, and the like; the term "lower-alkoxy" is intended to mean an alkoxy radical containing from one to eight carbon atoms, inclusive, such as methoxy, ethoxy, propoxy, butoxy, amyloxy, hexyloxy, heptyloxy, octyloxy, and isomeric forms thereof; the term "lower-aralkoxy" is intended to mean an aralkoxy radical containing from seven to thirteen carbon atoms, inclusive, such as benzyloxy, phenylethoxy, benzhydryloxy, and the like; and the term "lower-aryloxy" is intended to mean an aryloxy radical containing from six to twelve carbon atoms such as phenoxy, tolyloxy, xylyloxy, naphthoxy, biphenylyloxy, and the like. The term "a ketose sugar" is intended to include ketopentoses such as D-xylulose, L-xylulose, D-ribulose, and L-ribulose, ketohexoses such as D-psicose, L-psicose, D-fructose, L-fructose, D-sorbose, L-sorbose, L-tagatose, and D-tagatose and ketoheptoses such as D-alloheptulose, D-sedoheptulose, D-glucoheptulose, L-glucoheptulose, D-mannoheptulose, and L-galatoheptulose. The ketohexoses and ketoheptoses can exist in both the furanose (five-membered ring) and pyranose (six-membered ring) forms and, when the group X in the above Formula I represents the residue of a ketohexose or a ketoheptose, it is to be understood that this includes both the furanose and pyranose forms of the sugar. The ketopentoses, however, can be present only in the furanose form.

The process of the invention comprises the steps of reacting a halomercuri derivative of a purine having the general formula:

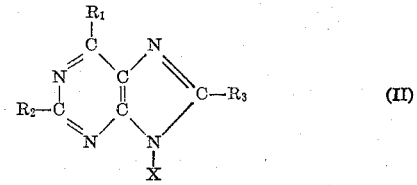

(II)

wherein $R_1$, $R_2$ and $R_3$ have the significance hereinbefore defined, with a polyacyl ester of a 2-halogenoketose, in the presence of an inert solvent, the hydrolyzing the polyacyl-ketosidopurine so obtained to produce the required compound having the Formula I above.

When the purine employed as starting material contains a free amino group, i.e., when one or more of the groups $R_1$, $R_2$, and $R_3$ in the compound of Formula II above represent free amino groups, it is preferable, though not essential, to convert this compound to the corresponding acylamino derivative before carrying out the process of the invention. The acylamino group will be reconverted to a free amino group in the hydrolysis step of the process of the invention thus yielding the desired compound of Formula I above.

The acyl groups which can be employed to protect the free amino group or groups in the purine starting material, as well as those which can be present in the polyacyl 2-halogenoketose employed in the process of the invention, are those corresponding to hydrocarbon carboxylic acids containing from 1 to 12 carbon atoms, inclusive. Said hydrocarbon carboxylic acids can be unsubstituted or can be substituted by one or more halo, nitro, cyano, thiocyano, and lower-alkoxy radicals. Suitable acids include acetic, propionic, butyric, isobutyric, tert-butylacetic, valeric, isovaleric, caproic, caprylic, decanoic, dodecanoic, acrylic, crotonic, hexynoic heptynoic octynoic, cyclobutane-carboxylic, cyclopentane-carboxylic, cyclopentene-carboxylic, methylcyclopentene-carboxylic, cyclohexane-carboxylic, dimethylcyclohexane-carboxylic, cyclopentane-acetic, cyclohexane-butyric, methylcyclohexane-acetic, benzoic, toluic, naphthoic, ethylbenzoic, phenylacetic, naphthaleneacetic, phenylvaleric, cinnamic, phenylpropiolic, chloroacetic, bromobutyric, iodovaleric, chlorocyclohexane - carboxylic, chlorobenzoic, anisic, nitrobenzoic, cyanoacetic, thiocyanoacetic acids, and the like.

When the purine employed as starting material contains a free hydroxyl group, i.e., when one or more of the groups $R_1$, $R_2$, and $R_3$ in the purine having the Formula II represent free hydroxyl groups, it is desirable, though not essential, to convert said compound or compounds to the corresponding aralkoxy derivatives before carrying out the process of the invention. The aralkoxy group or groups can be reconverted to a free hydroxy group or groups, after carrying out the process of the invention, by means which will be described hereinafter.

The reaction of a halomercuri derivative of a purine having the Formula II above and the polyacyl 2-halogenoketose, according to the process of the invention, is carried out advantageously by heating the reactants at a temperature within the range of about 50° C. to about 150° C. in the presence of an inert solvent. Preferably the reaction temperature is within the range of about 120° C. to about 150° C. The reaction time can vary according to the reaction temperature employed but is generally of the order of about one to about three hours. The inert solvents which can be employed are those solvents which are inert, i.e., do not enter into reaction with either of the principal reactants, under the conditions of the reaction. Such solvents include benzene, toluene, xylene, decalin, carbon tetrachloride, and the like.

The polyacyl-ketosidopurine, which is formed as intermediate in the process of the invention, can be isolated from the reaction mixture by conventional means, for example, by evaporation of the solvent employed in the reaction, and can be de-acylated without purification. If desired, however, the polyacyl-ketosidopurine so obtained can be purified, for example, by recrystallization or by countercurrent distribution using a suitable solvent system, before deacylation. The deacylation can be effected by means known in the art. A particularly convenient procedure for the deacylation consists in the treatment of the polyacyl derivative with a saturated solution of ammonia in methanol at a temperature not greater than 30° C. and preferably approximately 0° C. as described by Davoll and Lowy, J. Am. Chem. Soc. 73, 1650 (1951), for the deacetylation of 6-acetamido-9-tetraacetyl-$\beta$-D-glucopyranosylpurine. The required compound having the Formula I above can be isolated from the reaction mixture and purified, if necessary, by conventional procedures, for example, by subjecting to countercurrent distribution using a suitable solvent system.

When one or more of the groups $R_1$, $R_2$, and $R_3$ in the compound of Formula I, produced by the process of the invention, represents a lower-alkylmercapto, lower-aralkylmercapto, or lower-arylmercapto group, said group or groups can be removed by hydrogenolysis in a subsequent step. The hydrogenolysis can be carried out in a convenient manner by refluxing the compound with Raney nickel catalyst in the presence of a neutral, non-halogenated solvent such as methanol, ethanol, propanol, and the like.

When one or more of the groups $R_1$, $R_2$, and $R_3$ in the compound of Formula I, produced by the process of the invention, represents a lower-aralkoxy group, said group or groups can be converted to a free hydroxy group or groups, for example, by hydrogenolysis, in a subsequent step. The hydrogenolysis can be carried out in a convenient manner by catalytic hydrogenation in the presence of a catalyst such as palladium-on-charcoal.

When one or more of the groups $R_1$, $R_2$ and $R_3$ in the compound of Formula I, produced by the process of the invention, represents a halogen atom or atoms said compound can be reacted with ammonia, or an amine having the formula

wherein $R_4$ and $R_5$ have the significance hereinbefore described, whereby the halogen atom or atoms is replaced by the group

i.e., there is produced the corresponding compound of the Formula I in which one or more of the groups $R_1$, $R_2$, and $R_3$ represents

The reaction of the halopurine with ammonia or the amine can be carried out using the procedure described by Albert and Brown, J. Chem. Soc. 1954, 2060–71 for the conversion of 6-chloropurine to 6-dimethylaminopurine.

Many of the purines of Formula II above which can be employed as starting materials in the process of the invention are known compounds which either occur in nature or whose preparation has been described in the literature. Thus, adenine (6-aminopurine), guanine (2-amino-6-hydroxypurine), xanthine (2,6-dihydroxypurine), hypoxanthine (6-hydroxypurine), and uric acid (2,6,8-trihydroxypurine) occur widely in nature. Albert and Brown (supra) have described the preparation of 2-methoxy-, 2-mercapto-, 2-methylmercapto, 2,6-diamino-, 2-amino-8-phenyl-, 6-methylamino, 6-dimethylamino-, 8-phenyl-, 8-methyl-, 8-hydroxy-, 2,8-dihydroxy-, 6,8-dihydroxy-, 8-mercapto-, 8-amino-, 8-methylamino-, and 8-dimethylaminopurine. In U.S. Patent 2,705,715 there is described the condensation of 2-substituted-mercapto-4,5-diamino-6-disubstituted-aminopyrimidines with carbon disulfide in the presence of pyridine to yield 2-methylmercapto-6-dimethylamino-8-mercaptopurine, 2-methylmercapto-6-diethylamino-8-mercaptopurine, 2-methylmethylmercapto-6-methylanilino-8-mercaptopurine, and 2-methylmercapto-6-butylbenzylamino-8-mercaptopurine. Robins and Christenson, J. Am. Chem. Soc. 74, 3624 (1952), described the reaction of uric acid, xanthine, and hypoxanthine with phosphorus oxychloride in the presence of a tertiary aliphatic amine to yield the corresponding dialkylaminopurines and bis-dialkylaminopurines and this reaction can be applied to the preparation of the dialkylaminopurines having the Formula II above. The latter compounds together with the corresponding alkyl-aralkylamino-, diaralkylamino-, diarylamino-, and alkyl-arylaminopurines having the Formula II above can also be prepared by reacting the corresponding mercaptopurines [2-mercapto-, and 8-mercaptopurine are described by Albert and Brown (supra); 6-mercaptopurine is described in U.S. Patent 2,724,711] with the appropriate amine as described by Albert and Brown (supra).

The purines having the Formula II above in which one or more of the groups $R_1$, $R_2$, and $R_3$ represents a halogen atom can be obtained by reaction of the corresponding hydroxy compounds with a phosphorus oxyhalide in the presence of a tertiary amine using the procedure described by Bendich et al., J. Am. Chem. Soc. 76, 6073–7 (1954) for the conversion of 6-hydroxypurine to 6-chloropurine. Many halopurines having the Formula II above have been described. Illustratively 2,6-diiodopurine was prepared by Fischer, Berichte, 31, 2551; 2,6,8-trichloropurine was prepared by Fischer, Berichte, 30, 220; 6-chloro-8-methylmercapto-2-methylpurine was prepared by King and King, J. Chem. Soc. 1947, 943–8; and a series of 2-amino-6-halo-8-phenylpurines has been described in U.S. Patent 2,628,235.

The following methods, which are of general application, can also be applied to the preparation of purines having the Formula II above.

(a) The compounds having the Formula II, in which $R_1$ and $R_2$ have the significance hereinbefore defined and $R_3$ represents a hydroxy group, can be prepared by acylation and cyclization of the corresponding substituted 4:5-diaminopyrimidine according to the method described by Traube, Berichte, 33, 3035 (1900). If the acylating agent is an aroyl halide the corresponding 8-aryl derivatives are obtained as described by Albert and Brown (supra).

(b) The compounds having the Formula II above, in which $R_1$ and $R_2$ have the significance hereinbefore defined and $R_3$ represents a mercapto group can be obtained by thioformylation, and subsequent cyclization, of the appropriately substituted 4:5-diaminopyrimidines according to the procedure described by Todd et al., J. Chem. Soc. 1936, 1557. The 8-mercaptopurines so obtained can then be converted to the corresponding 8-amino-, 8-monosubstituted-amino- and 8-disubstituted-aminopurines by reaction with ammonia or the appropriate amine according to the procedure described by Albert and Brown (supra); alternatively the 8-mercaptopurines can be etherified by treating with an alkyl or aralkyl halide. The resulting thioether can be subjected to hydrogenolysis as hereinbefore described to produce the corresponding 8-unsubstituted-purines.

The halomercuri derivatives of the purines having the Formula II above which are employed as starting materials in the process of the invention can be prepared by reacting a mercuric halide, preferably mercuric chloride, with a purine having the Formula II above using the procedure described by Davoll and Lowy (supra) for the preparation of the chloromercuri derivatives of 6-acetamidopurine and 6-benzamidopurine.

The polyacyl 2-halogenoketoses employed as starting materials can be prepared from the corresponding ketoses by the procedure described by Fischer, Berichte, 44, 1899 (1911), for the preparation of tetraacetyl-glucosyl bromide.

The compounds having the Formula I above, which are obtained by the process of the invention, can be converted to the corresponding acylates, for example, by reaction with the acid halide or acid anhydride of a hydrocarbon carboxylic acid as hereinbefore defined, in the presence of a tertiary amine. Suitable tertiary amines include pyridine, quinoline, isoquinoline, trialkylamines such as triethylamine, triisopropylamine, and the like, N,N-dialkylanilines such as dimethylaniline, diethylaniline, and the like, and N-alkylpiperidines such as N-methylpiperidine, N-ethylpiperidine, and the like. By employing equimolar proportions of the acid anhydride or halide and the compound having the Formula I above there can be obtained a mixture of the mono-acyl derivatives. Such mixtures can be separated into their component parts by conventional methods, for example, by countercurrent distribution using a suitable solvent system. Similarly, by employing the appropriate proportions of the acid anhydride or halide and the compound having the Formula I there can be obtained the corresponding diacylates, triacylates, tetraacylates, and, where one or more of the groups $R_1$, $R_2$ and $R_3$ represents amino, the corresponding pentaacylates and higher acylates. Further by acylation of a mono-, di-, or triacylate so obtained, using an acid anhydride or acid halide other than the one employed in the first acylation, there can be obtained mixed acylates, i.e., acylates in which the acyl groups are not all identical.

The 3'-monoacylates, 4'-monoacylates (and 5'-monoacylates where the ketose residue is in the pyranose ring form) and 3',4'-diacylates (and 3',4'-diacylates, 3',5'-diacylates, 4',5'-diacylates and 3',4',5'-triacylates where the ketose residue is in the pyranose ring form) of the compounds having the Formula I can be prepared in a convenient manner as follows. The compound having the Formula I can be reacted with an excess of a trityl halide, for example, trityl chloride or trityl bromide, in the presence of a tertiary amine as hereinbefore defined. The primary alcohol groups in the ketose residue will be converted to trityloxy groups whereas the secondary alcohol groups, i.e., those in the 3'- and 4'-positions when the ketose is in the furanose form and those in the 3'-, 4',- and 5'-positions when the ketose is in the pyranose form, will remain unsubstituted. Similarly where any of the groups $R_1$, $R_2$, and $R_3$ in the purine residue of the compound I represents a free amino or free mercapto group, said group or groups will be tritylated. The trityl derivative so obtained can then be acylated by reaction with an acid anhydride or halide of a hydrocarbon carboxylic acid as hereinbefore defined in the presence of a tertiary amine as hereinbefore defined. Where equimolar proportions of acylating agent and trityl derivative are employed there will be obtained a mixture of the corresponding 3'-monoacylate, 4'monoacylate and, where the ketose residue is in the pyranose form, the 5'-monoacylate. Said mixture can be separated into its component parts by conventional procedures, for example, by countercurrent distribution in a suitable solvent system. Using at least 2 molar proportions of acylating agent per mole of trityl derivative in the above acylation, the latter can be converted to the corresponding 3',4'-diacylate or, when the ketose residue is present in the pyranose form, to the corresponding 3',4'-diacylate, 3',5'-diacylate, 4',5'-diacylate and 3',4',5'-triacylate, which can be separated by conventional procedures. The acylated trityl derivatives so obtained are then treated, for example, by hydrogenolysis in the presence of a suitable catalyst such as palladium-on-charcoal, to remove the trityl groups and yield the corresponding mono-, di- and tri- (where the ketose is in the pyranose form) acyl derivatives of the compounds having the Formula I. Said acyl derivatives can then be subjected to further acylation, if desired, to obtain the higher polyacylates. This further acylation can be accomplished using an acylating agent derived from a hydrocarbon carboxylic acid which can be identical to or different from that used in the first acylation. In the latter case there will be produced polyacylates in which the acyl groups in the 3'- and 4'-positions (and 5'-position where the ketose is in the pyranose form) differ from those in the other acylated centers in the molecule.

Whilst the process of the invention is of general application and can be applied to the preparation of nucleosides from any ketose sugar and any purine which is unsubstituted in the 9-position, the process is particularly valuable as a means of obtaining, by chemical synthesis, the compound 6-amino-9-D-psicofuranosylpurine. The latter compound, which is active as an antibiotic, can be obtained as an elaboration product of the organism *Streptomyces hygroscopicus* var. *decoyicus* as described in copending application Serial No. 720,066, filed March 10, 1958. The above compound is prepared, according to the process of the present invention, by the reaction of a halomercuric derivative of an acyladenine with a tetraacyl-D-psicofuranosyl chloride or bromide in the presence of an inert solvent as hereinbefore defined, and the penta-acyl compound so obtained is hydrolyzed, for example, by treatment with a saturated solution of ammonia in methanol, to yield the desired compound.

The compounds having the Formula I above, which are prepared by the process of the present invention, exhibit antibacterial activity when administered orally or parenterally to animals. Illustratively, the compound 6-amino-9-D-psicofuranosylpurine is active as an antibiotic as previously mentioned. The compound 6-mercapto-9-D-psicofuranosylpurine is active in vivo against *S. hemolyticus*. The compound, 6-hydroxy-9-D-psicofuranosylpurine shows marked in vivo activity against *S. hemolyticus*. Further, the compounds having the Formula I above, as well as materials which can be derived readily therefrom, such as the corresponding nucleotides, i.e., the monophosphates and polyphosphates analogous to the aforementioned adenylic acid (adenosine-monophosphate) and adenosine triphosphate, are valuable in studying metabolic processes in cells, novel nucleosides and nucleotides being currently in great demand for this purpose. The compounds having the Formula I have not yet been established as safe and effective for use in humans.

The compounds having the Formula I above, which can be produced by the process of the invention, can be combined with solid or liquid pharmaceutical carriers and formulated into the form of tablets, powder packets, or capsules, or dissolved or suspended in suitable solvents, for oral or parenteral administration.

The following examples are illustrative of the process of the present invention, but are not to be construed as limiting.

*Example 1.—6-amino-9-D-psicofuranosylpurine*

A solution of 3 g. (0.0166 mole) of D-psicose in 15 ml. (0.161 mole) of acetic anhydride and 15 ml. of dry pyridine was allowed to stand at 2° C. for 2 hours and then for an additional 20 hours at room temperature. The resulting solution was poured into ice-water and the oil which separated was extracted with chloroform. The chloroform solution was washed successively with 3 separate 150 ml. portions of N hydrochloric acid, one portion of saturated sodium bicarbonate solution and finally with water. The chloroform solution was then dried over anhydrous magnesium sulfate, filtered, and the filtrate evaporated to dryness in vacuo at 40° C. There was thus obtained 5.8 g. of crude D-psicose penta-acetate in the form of a yellow oil; $[\alpha]_D^{24} = +7.5°$ (c.=2.2 in ethanol). A solution of 3.0 g. of the penta-acetate so obtained, in 115 ml. of absolute ether, was maintained at 0° C. and saturated with dry gaseous hydrogen chloride. The solution was then allowed to stand at 2° C. for 42 hours after which the ether and hydrogen chloride were removed by distillation under reduced pressure at 20° C. The last traces of hydrogen chloride were removed from the residue by treating the latter with several small portions of carbon tetrachloride and benzene, each portion being removed by distillation under reduced pressure. There was thus obtained tetra-acetyl D-psicofuranosyl chloride in the form of a yellow oil. The latter compound was dissolved in a small quantity of anhydrous xylene and the solution was added to an anhydrous suspension of 4 g. of chloromercuri-acetyladenine [Davoll and Lowy (supra)] in 100 ml. of xylene. The mixture was heated under reflux with stirring for 3 hours and the resulting suspension was filtered while hot. The filtrate was evaporated to dryness under reduced pressure. The 9-D-psicofuranosyladenine penta-acetate so obtained was treated with 100 ml. of methanol saturated with ammonia at 0° C. The resulting mixture was allowed to stand at 0° C. for 18 hours. The solid which had separated was removed by filtration and the filtrate was evaporated to dryness under reduced pressure at 30° C. The residual brown solid was subjected to 985 transfers in a Craig countercurrent distribution machine using a solvent system of butanol : water. The tubes containing the peak at K=0.3 were combined and evaporated to dryness in vacuo. The residue was dissolved in 50% aqueous acetone, treated with decolorizing charcoal, evaporated almost to dryness and allowed to stand overnight. The crystalline material was separated from supernatant liquor on a porous tile and recrystallized from 50% aqueous acetone. There was thus obtained 6-amino-9-D-psicofuranosylpurine in the form of a crystalline solid having a melting point of 190 to 195° C. undepressed by an authentic specimen; $[\alpha]_D^{24} = -55°$ (c.=0.5 in dimethylsulfoxide).

In like manner, but replacing chloromercuri-acetyladenine by the chloromercuri derivatives of purine, 6-methylaminopurine, 6-dimethylaminopurine, 2-methoxypurine, 2-acetylamino-8-phenylpurine, 6-benzylmercaptopurine, 2-methylpurine, and 8-phenylpurine there are obtained 9-D-psicofuranosylpurine, 6-methylamino-9-D-psicofuranosylpurine, 6-dimethylamino-9-D-psicofuranosylpurine, 2-methoxy-9-D-psicofuranosylpurine, 2-acetylamino - 8 - phenyl - 9 - D-psicofuranosylpurine, 6-benzylmercapto-9-D-psicofuranosylpurine, 2-methyl-9-D-psicofuranosylpurine, and 8-phenyl-9-D-psicofuranosylpurine, respectively.

*Example 2.—6-amino-9-D-fructofuranosylpurine*

A. *D-fructofuranosylchloride tetrabenzoate.*—A solution of 11.92 g. (.02 mole) of D-fructofuranose tetrabenzoate [prepared according to the method of P. Brigl and R. Schinle, Berichte 67, 127 (1943)] in 50 ml. of acetyl chloride was treated with gaseous hydrogen chloride at room temperature. After slowly bubbling the gas through the solution for 3 hours, the solution was allowed to stand overnight. Removal of the acetyl chloride in vacuo left a viscous syrup which was freed of residual hydrogen chloride by the addition of carbon tetrachloride and its subsequent removal in vacuo. The resulting syrup was then subjected to high vacuum for several hours to remove other volatile impurities. The amorphous residue was used directly for the condensation with chloromercuripurines.

In like manner, by substituting the appropriate ketose polybenzoate [prepared from the ketose using the method of Brigl and Schinle (supra)] for D-fructose tetrabenzoate there can be obtained D-xylulofuranosylchloride tribenzoate, D-ribulofuranosylchloride tribenzoate, D-sorbofuranosylchloride tetrabenzoate, D-tagatofuranosylchloride tetrabenzoate, D-psicopyranosyl chloride tetrabenzoate, L-psicofuranosylchloride tetrabenzoate, D-altroheptulopyranosylchloride pentabenzoate, D-glucoheptulofuranosylchloride pentabenzoate, D-mannoheptulopyranosylchloride pentabenzoate, L - glucoheptulofuranosyl - chloride pentabenzoate, and D-sedoheptulofuranosylchloride pentabenzoate.

B. *6-amino-9-D-fructofuranosylpurine.*—To a well-dried suspension of 10 g. (0.025 mole) of chloromercuri-acetyladenine [Davoll and Lowy (supra)] in 200 ml. of xylene, was added a solution of 14.4 g. (0.023 mole) of D-fructofuranosylchloride tetrabenzoate (prepared as described above) in 40 ml. of carbon tetrachloride. The resulting mixture was heated at 105 to 110° C. for two hours. The insoluble material was then removed from the hot solution by filtration and the filtrate was added to 1.5 liters of Skellysolve B (a mixture of hexanes). The precipitate so formed was isolated by filtration, washed with Skellysolve B and dried. There was thus obtained 7 g. of impure 6-acetylamino-9-D-fructofuranosylpurine tetrabenzoate. A solution of 5 g. of the latter compound in 200 ml. of methanol was saturated with ammonia at 20° C. The mixture was allowed to stand overnight at this temperature and then filtered and the filtrate evaporated to dryness. The residue was taken up in a mixture of 150 ml. of water and 150 ml. of ether. The aqueous phase was separated and re-extracted with ether. After blowing nitrogen through the aqueous solution to remove residual ether, the solution was treated with 12 g. of activated charcoal (Darco G–60) and the mixture was stirred for 30 minutes. The charcoal was collected by filtration, washed with cold water, dried, and extracted with hot 90% acetone. The acetone extract was evaporated in vacuo and the aqueous residue was freeze-dried. The amorphous residue was dissolved in a small quantity of ethanol. Crystalline material separated from the solution on standing and was isolated by filtration and recrystallized from methanol. There was thus obtained 6-amino-9-D-fructofuranosylpurine as a colorless crystalline solid having a melting point of 219.5° to 220.5° C.; $[\alpha]_D^{28} = +92°$ (c.=1 in dimethylformamide).

*Analysis.*—Calcd. for $C_{11}H_{15}N_5O_5$: C, 44.44; H, 5.09; N. 23.56. Found: C, 44.55; H, 5.53; N, 23.31.

In like manner, but replacing D-fructofuranosylchloride tetrabenzoate by D-fructopyranosylchloride tetrabenzoate, D-xylulofuranosylchloride tribenzoate, D-ribulofuranosylchloride tribenzoate, D-sorbofuranosylchloride tetrabenzoate, D-sorbopyranosylchloride tetrabenzoate, D-tagatofuranosylchloride tetrabenzoate, L-psicofuranosylchloride tetrabenzoate, D-psicopyranosylchloride tetrabenzoate, D-altroheptulopyranosylchloride pentabenzoate, D - mannoheptulofuranosylchloride pentabenzoate, D - glycoheptulopyranosylchloride pentabenzoate, L-glucoheptulofuranosylchloride pentabenzoate, and D-sedoheptulofuranosylchloride pentabenzoate, there are obtained 6-amino-9-D-fructopyranosylpurine, 6-amino-9-D-xylulofuranosylpurine, 6 - amino - 9 - D-ribulofuranosylpurine, 6-amino-9-D-sorbofuranosylpurine, 6-amino-9-D-sorbopyranosylpurine, 6 - amino - 9 - D - tagatofuranosylpurine, 6-amino-9-L-psicofuranosylpurine, 6-amino-9-D-psicopyranosylpurine, 6-amino-9-D-altroheptulopyranosylpurine, 6-amino-9-D-mannoheptulofuranosylpurine, 6-amino - 9 - D-glucoheptulopyranosylpurine, 6-amino-9-L-glucoheptulofuranosylpurine, and 6 - amino - 9-D-sedoheptuolofuranosylpurine, respectively.

*Example 3.*—*6-methylmercapto-9-D-psicofuranosylpurine*

Using the procedure described in Example 1, but substituting chloromercuri 6-methylmercaptopurine [prepared from 6-methylmercaptopurine (Albert and Brown, supra) by the method of Davoll and Lowy (supra)] for chloromercuri acetyladenine, there was obtained 6-methylmercapto-9-D-psicofuranosylpurine.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A process for the preparation of a ketosidopurine having the general formula:

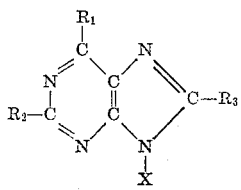

wherein the groups $R_1$, $R_2$, and $R_3$ are selected from the class consisting of hydrogen, halogen, alkyl from 1 to 8 carbon atoms, inclusive, aralkyl from 7 to 13 carbon atoms, inclusive, aryl from 6 to 12 carbon atoms, inclusive, mercapto, alkylmercapto from 1 to 8 carbon atoms, inclusive, aralkylmercapto from 7 to 13 carbon atoms, inclusive, arylmercapto from 6 to 12 carbon atoms, inclusive, hydroxy, alkoxy from 1 to 8 carbon atoms, inclusive, aralkoxy from 7 to 13 carbon atoms, inclusive, aryloxy from 6 to 12 carbon atoms, inclusive, and

wherein $R_4$ and $R_5$ are selected from the class consisting of hydrogen, alkyl from 1 to 8 carbon atoms, inclusive, aralkyl from 7 to 13 carbon atoms, inclusive, and aryl from 6 to 12 carbon atoms, inclusive, and X represents the residue of a ketose sugar containing from 5 to 7 carbon atoms, inclusive, which comprises reacting a halomercury derivative of a purine having the general formula:

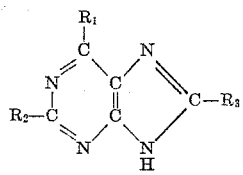

wherein $R_1$, $R_2$, and $R_3$ have the significance hereinbefore defined, with a polyacyl ester of 2-halogenoketose wherein the acyl radicals are those corresponding to a hydrocarbon carboxylic acid containing from 1 to 12 carbon atoms, inclusive, in the presence of an inert solvent, and the polyacyl-ketosidopurine so obtained is deacylated to yield the required ketosidopurine.

2. The process of claim 1 wherein, when at least one of the groups $R_1$, $R_2$, and $R_3$ in the purine starting material represents an amino group, said amino group is protected by an acyl group corresponding to a hydrocarbon carboxylic acid containing from 1 to 12 carbon atoms, inclusive, before the purine is converted to the halomercury derivative.

3. The process of claim 1 in which the halo-mercuripurine and the polyacyl ester of a 2-halogeno-ketose are heated together in the presence of an inert solvent at a temperature within the range of about 50° C. to about 150° C.

4. The process of claim 1 in which the halo-mercuripurine and the polyacyl ester of a 2-halogeno-ketose are heated together in the presence of an inert solvent at a temperature within the range of about 120° C. to about 150° C.

5. The process of claim 1 in which the 2-halogenoketose is a 2-halogenoketopentose.

6. The process of claim 1 in which the 2-halogenoketose is a 2-halogenoketohexose.

7. The process of claim 1 in which the 2-halogenoketose is a 2-halogenoketoheptose.

8. The process of claim 1 in which the polyacyl ester of a 2-halogenoketose is a triacetyl-2-halogenoketopentose.

9. The process of claim 1 in which the polyacyl ester of a 2-halogenoketose is a tetraacetyl-2-halogenoketohexose.

10. The process of claim 1 in which the polyacyl ester of a 2-halogenoketose is a pentaacetyl-2-halogenoketoheptose.

11. The process of claim 1 in which the polyacylketosidopurine is deacylated by treatment with ammonia in methanol solution at a temperature within the range of about 0° C. to about 30° C.

12. A process for the preparation of 6-amino-9-D-psicofuranosylpurine which comprises reacting a 9-chloromercuri-acyladenine with a D-tetraacylpsicofuranosyl halide in the presence of an inert solvent at a temperature within the range of about 50° C. to about 150° C. and deacylating the 6-acylamino-9-D-tetraacylpsicofuranosylpurine so obtained.

13. The process of claim 12 in which the 9-chloromercuri-acyladenine is 9-chloromercuri-acetyladenine.

14. The process of claim 12 in which the D-tetraacylpsicofuranosyl halide is D-tetraacetylpsicofuranosyl chloride.

15. The process of claim 12 in which the 6-acylamino-9-D-tetraacylpsicofuranosylpurine is deacylated by treatment with ammonia in methanol solution at a temperature within the range of about 0° C. to about 30° C.

16. A process for the preparation of 6-methylmercapto-9-D-psicofuranosylpurine which comprises reacting 9-chloromercuri-6-methylmercaptopurine with a D-tetraacylpsicofuranosyl halide in the presence of an inert solvent at a temperature within the range of about 50° C.

to about 150° C. and deacylating the 6-methylmercapto-9-D-tetraacylpsicofuranosylpurine so obtained.

17. The process of claim 16 in which the D-tetraacylpsicofuranosyl halide is D-tetraacetylpsicofuranosyl chloride.

18. The process of claim 16 in which the 6-methylmercapto-9-D-tetraacylpsicofuranosylpurine is deacylated by treatment with ammonia in methanol solution at a temperature within the range of about 0° C. to about 30° C.

19. A process for the preparation of 6-amino-9-D-fructofuranosylpurine which comprises reacting a 9-chloromercuriacyladenine with a D-tetraacyl-fructofuranosyl halide in the presence of an inert solvent at a temperature within the range of about 50° C. to about 150° C. and deacylating the 6-acylamino-9-D-tetraacylfructofuranosylpurine so obtained.

20. The process of claim 19 in which the 9-chloromercuriacyladenine is 9-chloromercuri-acetyladenine.

21. The process of claim 19 in which the D-tetraacyl-fructofuranosyl halide is D-tetrabenzoyl-fructofuranosyl chloride.

22. The process of claim 19 in which the 6-acylamino-9-D-tetraacyl-fructofuranosylpurine is deacylated by treatment with ammonia in methanol solution at a temperature within the range of about 0° C. to about 30° C.

References Cited in the file of this patent
UNITED STATES PATENTS

| | | |
|---|---|---|
| 2,719,843 | Davoll et al. | Oct. 4, 1955 |
| 2,830,985 | Baker et al. | Apr. 15, 1958 |

OTHER REFERENCES

Yuntsen: Jour. of Antibiotics, Ser. A, vol. XI, March 1958, pp. 77–80.

Yuntsen: Jour. of Antibiotics, Ser. A, vol. XI, November 1958, pp. 244–9.